(12) United States Patent
Ito

(10) Patent No.: US 8,720,622 B2
(45) Date of Patent: May 13, 2014

(54) INTERNAL MOTORIZED BICYCLE HUB

(75) Inventor: Minoru Ito, Osaka (JP)

(73) Assignee: Shimano Inc., Osaka (JP)

( * ) Notice: Subject to any disclaimer, the term of this patent is extended or adjusted under 35 U.S.C. 154(b) by 7 days.

(21) Appl. No.: 13/324,145

(22) Filed: Dec. 13, 2011

(65) Prior Publication Data
US 2012/0161495 A1 Jun. 28, 2012

(30) Foreign Application Priority Data

Dec. 24, 2010 (JP) .................................. 2010-288201

(51) Int. Cl.
*B60K 1/00* (2006.01)
(52) U.S. Cl.
USPC ...................................................... 180/65.51
(58) Field of Classification Search
USPC ...................................................... 180/65.51
See application file for complete search history.

(56) References Cited

U.S. PATENT DOCUMENTS

| 4,346,777 | A | 8/1982 | Restelli |
| 5,450,915 | A | 9/1995 | Li |
| 5,600,191 | A | 2/1997 | Yang |
| 5,782,716 | A | 7/1998 | Hukui et al. |
| 6,100,615 | A | 8/2000 | Birkestrand |
| 6,276,475 | B1 | 8/2001 | Nakanosono |
| 2006/0065452 | A1 | 3/2006 | Tomoshige et al. |
| 2007/0056785 | A1* | 3/2007 | Wu .............................. 180/65.5 |

FOREIGN PATENT DOCUMENTS

DE 697 11 342 T2 11/2002
EP 1 137 154 A1 9/2001

* cited by examiner

*Primary Examiner* — Jeffrey J Restifo
*Assistant Examiner* — Erez Gurari
(74) *Attorney, Agent, or Firm* — Global IP Counselors

(57) ABSTRACT

An internal motorized bicycle hub includes a hub axle, a motor, a partitioning wall section and at least one soundproofing member. The motor includes a stator. The partitioning wall section has least one opening and the stator mounted thereon. The at least one soundproofing member is disposed adjacent the partitioning wall section and blocking the at least one opening.

9 Claims, 6 Drawing Sheets

INTERNAL MOTORIZED BICYCLE HUB

CROSS-REFERENCE TO RELATED APPLICATIONS

This application claims priority under 35 U.S.C. §119 to Japanese Patent Application No. 2010-288201, filed Dec. 24, 2010. The entire disclosure of Japanese Patent Application No. 2010-288201 is hereby incorporated herein by reference.

BACKGROUND

1. Field of the Invention

This invention generally relates to a bicycle hub. More specifically, the invention relates to an internal motorized bicycle hub in which noise from a motor is reduced.

2. Background Information

An assisted bicycle is known in which a drive force imparted by human power is supplemented with a motor. In some cases, an assisted bicycle is provided with a bicycle hub that is equipped an internal motor. Typically, a conventional internal motorized bicycle hub has an axle that supports the motor (e.g., see Japanese Laid-Open Patent Publication No. 2005-335536).

SUMMARY

In the conventional assisted bicycle mentioned above, no consideration is given to the noise of the motor itself One object of the present disclosure is to provide an internal motorized bicycle hub that is configured to reduce the noise of the motor in the internal motorized bicycle hub.

In view of the state of the known technology, an internal motorized bicycle hub according to a first aspect is provided that comprises a hub axle, a motor, a partitioning wall section and at least one soundproofing member. The motor includes a stator. The partitioning wall section has least one opening and the stator mounted thereon. The at least one soundproofing member is disposed adjacent the partitioning wall section and blocking the at least one opening. With this internal motorized bicycle hub, the stator is mounted in the partitioning wall section and the opening of the partitioning wall section is obstructed with the soundproofing member. Consequently, noise generated inside the partitioning wall section propagates to an outside less readily and the noise of the motor can be reduced.

An internal motorized bicycle hub according to a second aspect is provided according to the first aspect, and further comprising an electrical component having a portion of the electrical component extending into the at least one opening. With this aspect, since a portion of an electrical component is arranged in the opening, a length of the hub along an axial direction of the hub can be shortened.

An internal motorized bicycle hub according to a third aspect is provided according to the second aspect, and further comprising a circuit board disposed adjacent the partitioning wall section, and the circuit board having the electrical component mounted thereon. With this aspect, the motor and the circuit board can be arranged in different spaces due to the partitioning wall section. As a result, the electrical component is less likely to be affected by heat emitted from the motor.

An internal motorized bicycle hub according to a fourth aspect is provided according to the third aspect, and further a motor case having the partitioning wall section, which divides the motor case into a first space housing the circuit board and a second space housing the motor. With this aspect, the motor and the circuit board can be arranged in a first space and a second space separated by the partitioning wall section. As a result, sound propagates to an outside even less readily.

An internal motorized bicycle hub according to a fifth aspect is provided according to the third or fourth aspect, wherein the circuit board includes a drive circuit that is electrically coupled to the motor. In this aspect, a drive circuit for the motor can be arranged close to the motor and the task of arranging wiring can be accomplished more easily.

An internal motorized bicycle hub according to a sixth aspect is provided according to the fourth or fifth aspect, wherein the motor case has a first case member and a second case member. The first case member defines the first space. The second case member defines the second space. The first case member has the partitioning wall section. The first case member is non-rotatably connected to the hub axle. The second case member has a first end rotatably supported on the first case member and a second end rotatably supported on the hub axle. With this aspect, the first space is formed in a first case member having a partitioning wall section that is non-rotatable with respect to the hub axle, and the second space is formed in a second case member that is rotatable with respect to the hub axle. Consequently, the two spaces can be reliably separated and noise propagates to an outside even less readily.

An internal motorized bicycle hub according to a seventh aspect is provided according to the sixth aspect, wherein the first case member has a case body and a cover member. The case body is non-rotatably attached to the hub axle and has the partitioning wall section. The cover member is fixed to the case body and forms the first space between the cover member and the partitioning wall section. With this aspect, it is easier to install the circuit board because the first space is covered with a cover member separate from the case body. Also, since the first space is covered with a cover member, noise propagates to an outside even less readily.

An internal motorized bicycle hub according to an eighth aspect is provided according to any one of the first to seventh aspects, wherein the partitioning wall section has a plurality of the openings, and the soundproofing material blocks all of the openings as a group. With this aspect, the soundproofing member is easy to install because it obstructs all of the openings as a group.

An internal motorized bicycle hub according to a ninth aspect is provided according to any one of the first to eighth aspects, wherein the soundproofing member has an annular shape. With this aspect, the existence of the soundproofing member does not affect the size of the internal motorized bicycle hub because the soundproofing member is shaped to conform to the shape of the rotary motor.

An internal motorized bicycle hub according to a tenth aspect is provided according to any one of the first to ninth aspects, wherein the soundproofing member is an elastic member. With this aspect, since the soundproofing member is elastic, noise propagates to an outside less readily and vibration can be suppressed.

In the internal motorized bicycle hub disclosed herein, the stator is mounted to the partitioning wall section and an opening of the partitioning wall section is obstructed or blocked with the soundproofing member. Consequently, noise generated inside the partitioning wall section does not readily propagate to the outside and the noise of the motor can be reduced.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
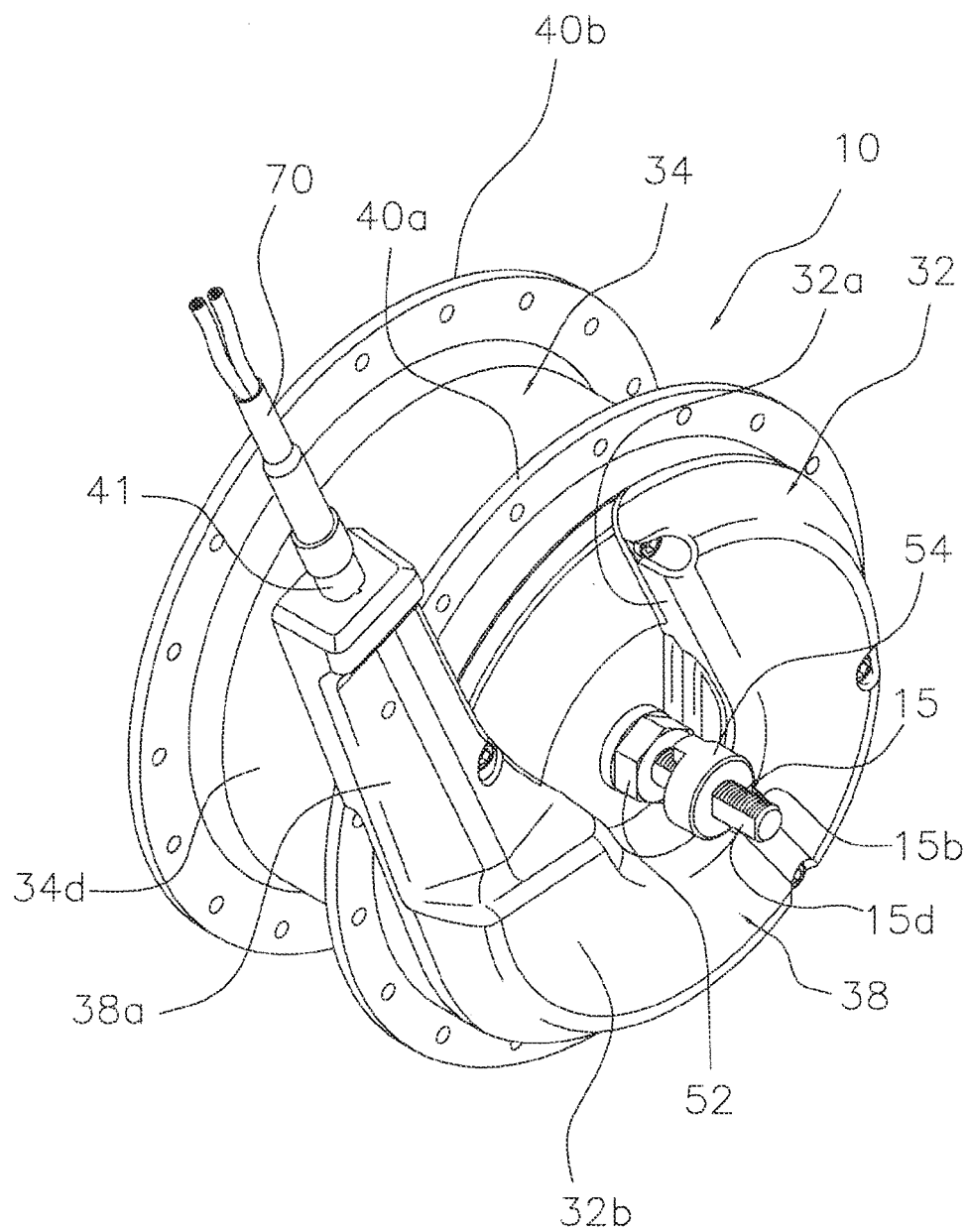
FIG. 1 is a perspective view of an internal motorized bicycle hub in accordance with a first embodiment.
Figure 2:
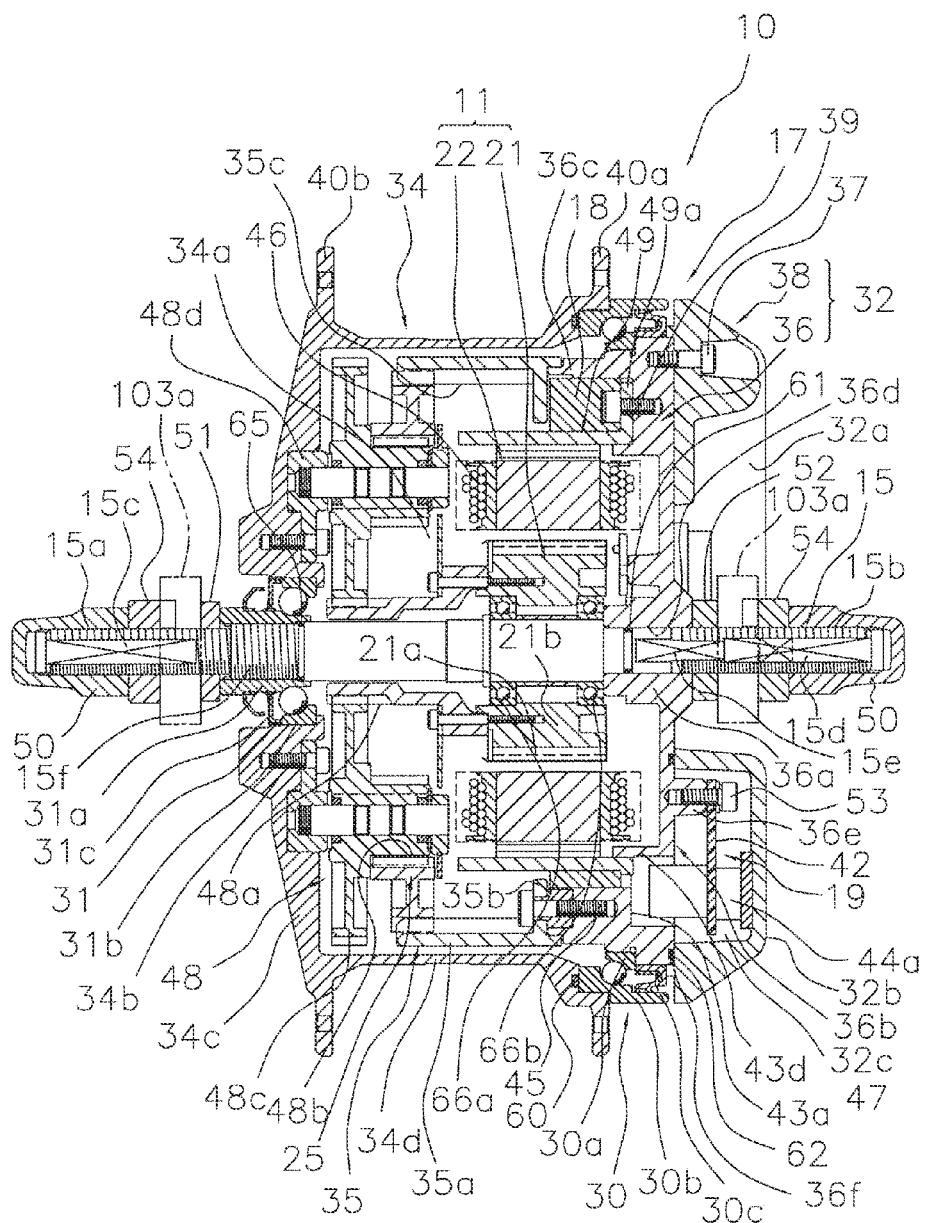
FIG. 2 is a cross sectional view of the internal motorized bicycle hub illustrated in FIG. 1.

Referring initially to FIG. 1, an internal motorized bicycle hub 10 is illustrated in accordance with a first embodiment. The internal motorized bicycle hub 10 is configured to be used in an assisted bicycle in which a drive force imparted by human power is supplemented with the internal motorized bicycle hub 10. The internal motorized bicycle hub 10 constitutes a hub for a front wheel of a bicycle. As shown in FIG. 2, the internal motorized bicycle hub 10 is attached to front fork ends 103 a of a front fork of the bicycle and serves to supplement a drive force imparted by human power.

As shown in FIG. 2, the internal motorized bicycle hub 10 includes a motor 11 mounted on a hub axle 15. The internal motorized bicycle hub 10 further comprises a motor case 17 that is attached to the hub axle 15 and that houses the motor 11. The internal motorized bicycle hub 10 further comprises a soundproofing member 18 that is disposed inside of the motor case 17. The internal motorized bicycle hub 10 also has a motor control circuit 19 that is housed inside the motor case 17. The motor control circuit 19 is an example of a motor control section. The motor 11 is, for example, a three-phase brushless DC motor. The motor 11 has a rotor 21 configured to rotate about the hub axle 15 and a stator 22 arranged around an outer perimeter of the rotor 21 so as to be non-rotatable with respect to the hub axle 15. The internal motorized bicycle hub 10 further comprises a rotation transmitting mechanism 25 housed inside the motor case 17.

Preferably, as illustrated, the internal motorized bicycle hub 10 further comprises a first bearing 30 and a second bearing 31, which are explained later. The motor case 17*a* preferably also has a first case member 32 and a second case member 34, which are explained later. The first case member 32 has a case body 36 and a cover member 38. As shown in FIG. 2, the case body 36 of the internal motorized bicycle hub 10 includes has a first boss 36*a*, a circular partitioning wall section 36*b* and a first cylindrical section 36*c*, which are explained later.

The hub axle 15 is made of steel or other iron-based metal that has not been quenched. The hub axle 15 is configured such that both ends can be attached non-rotatably to the front fork ends 103*a*. A first externally threaded section 15*a* and a second externally threaded section 15*b* are provided on external circumferential surfaces of the left and right ends of the hub axle 15. The first and second externally threaded sections 15*a* and 15*b* are configured to threadedly engage a pair (first and second) of nut members 50 to fasten the hub axle 15 to the front fork ends 103*a*. The first externally threaded section 15*a* has a first stopping section 15*c* that is formed on an external circumferential surface. The second externally threaded section 15*b* has a second stopping section 15*d* that is formed on external circumferential surface. Each of the stopping sections 15*c* and 15*d* has two parallel surfaces. A rotation stopping section 15*e* is formed on an axially inward side of the second stopping section 15*d* for non-rotatably connecting the first case member 32 (explained later) of the motor case 17. The first nut member 50 and a first lock nut 51 are screwed onto the first externally threaded section 15*a*. The second nut member 50 and a second lock nut 52 are screwed onto the second externally threaded section 15*b*. The second nut member 50 and the second lock nut 52 serve to fasten the first case member 32 to the hub axle 15. Rotation prevention washers 54 are installed onto the hub axle 15 on axially inward sides of the nut member 50. The rotation prevention washers 54 are configured to engage non-rotatably with each of the first stopping section 15*c* and the second stopping section 15*d* and with mounting grooves of the front fork in order to prevent the hub axle 15 from rotating.

A third externally threaded section 15*f* is formed on an axially inward side of the first externally threaded section 15*a*. The third externally threaded section 15*f* is configured to threadedly engage the bearing 31, which serves to rotatably support a second end of the second case member 34 (explained later) of the motor case 17. A middle portion of the hub axle 15 has a larger diameter than the first externally threaded section 15*a* and the second externally threaded section 15*b*.

As shown in FIG. 2, the first case member 32 of the motor case 17 is non-rotatably connected to the hub axle 15. The second case member 34 of the motor case 17 has a first end (right-hand end in FIG. 2) that is rotatably supported on the first case member 32 and a second end (left-hand end in FIG. 2) that is rotatably supported on the hub axle 15. The second case member 34 is made of, for example, an aluminum alloy.

As shown in FIG. 1, the cover member 38 has a recessed section 32*a* and a bulged section 32*b*. The bulged section 32*b* bulges axially outward to form the recessed section 32*a*. The recessed section 32*a* and the bulged section 32*b* are provided on an outward side face. The recessed section 32*a* is slightly wider than the shape of a tip end portion of a typical front fork in order to accommodate a variety of front fork shapes. As shown in FIG. 2, a first space 32*c* is formed inside the bulged section 32*b*. A second space 34*a* is formed inside the second case member 34 and the first case member 32.

The case body 36 of the first case member 32 is non-rotatably attached to the hub axle 15. The cover member 38 of the first case member 32 is fastened to an outward side face of the case body 36 with a plurality of (e.g., five) mounting bolts 37. The first space 32*c* is between the cover member 38 and the case body 36. The case body 36 and the cover member 38 are made of, for example, an aluminum alloy.

The first boss 36*a* of the case body 36 non-rotatably connects the case body 36 to the hub axle 15. The circular partitioning wall section 36*b* of the case body 36 is formed as an integral unit with the first boss section 36*a* as a one-piece, unitary member. The first cylindrical section 36*c* extends from an outer periphery of the partitioning wall section 36*b* towards the second case member 34. A non-circular connecting hole 36*d* is formed through an inside of the first boss section 36*a* for non-rotatably connecting the case body 36 to the rotation stopping section 15*e* of the hub axle 15.

Figure 3:
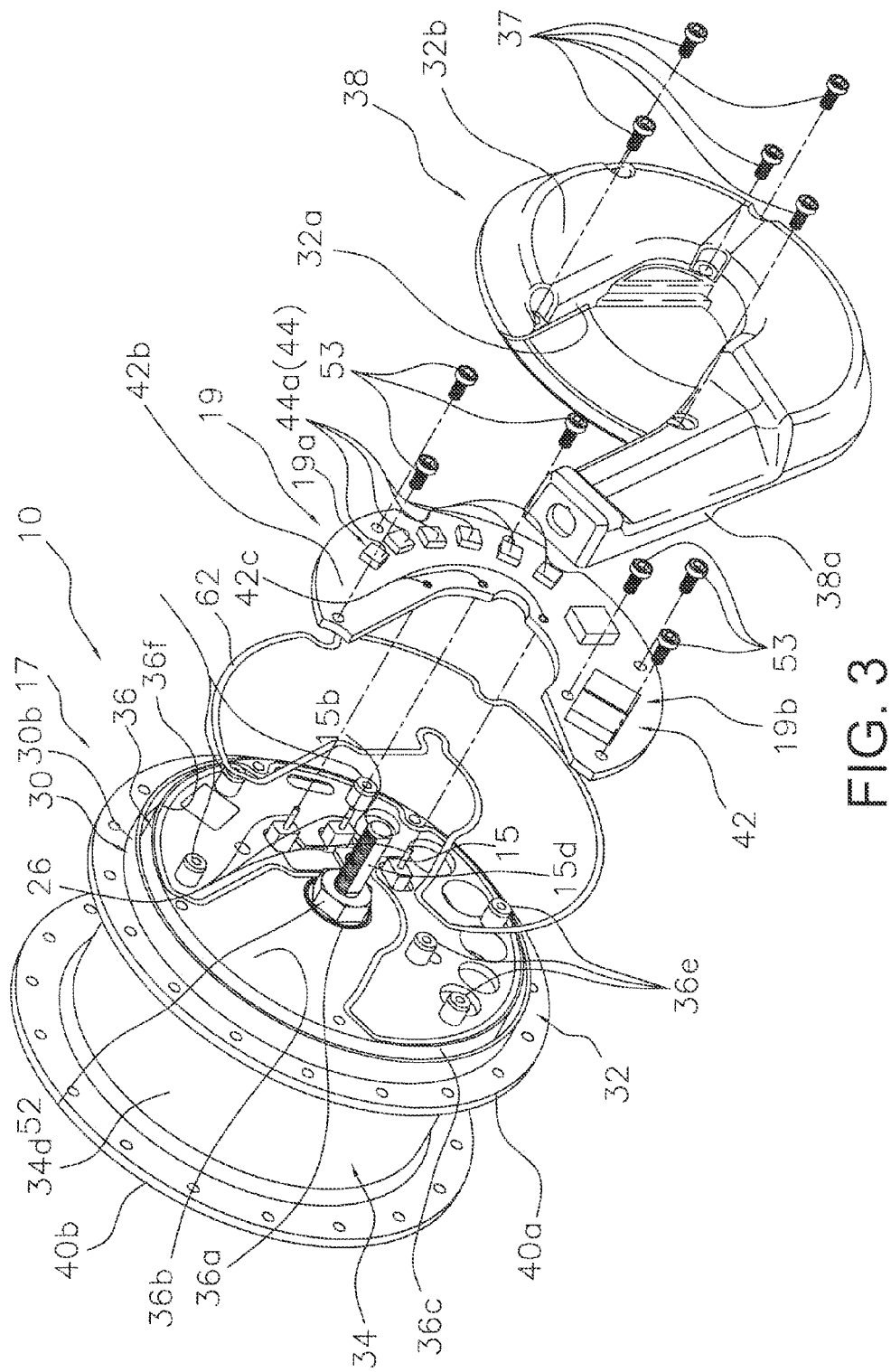
FIG. 3 is an exploded perspective view of a right-hand side of the internal motorized bicycle hub illustrated in FIGS. 1 and 2.

An outward side face (left-hand side in FIG. 2) of the partitioning wall section 36 is a generally flat surface. As shown in FIG. 3, a plurality of mounting bosses 36e are formed on the outward side face such that they protrude outward along an axial direction of the hub axle 15. The motor control circuit 19 is fastened to the mounting bosses 36e with mounting bolts 53.

Figure 4:
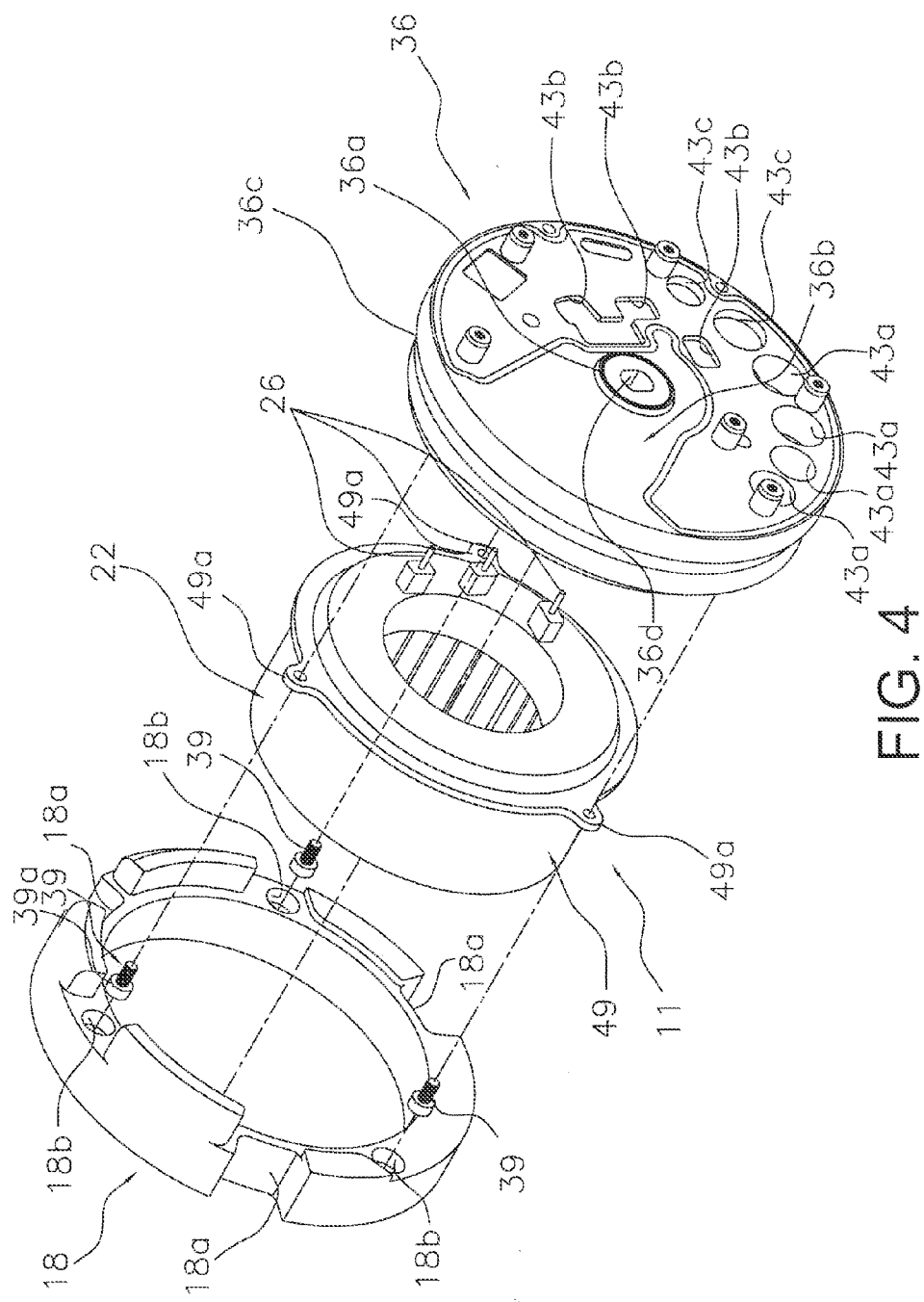
FIG. 4 is an exploded perspective view of a right-hand side of the soundproofing member, the motor and the case body of the internal motorized bicycle hub illustrated in FIGS. 1 to 3.

As shown in FIG. 4, the partitioning wall section 36b has a plurality of (e.g., four) openings 43a and a plurality of (e.g., two) recesses 43c. The openings 43a and the recesses 43c are arranged to accommodate at least a portion of first electric elements (explained later) that are mounted on the motor control circuit 19. The openings 43a pass completely through the partitioning wall section 36b. The recesses 43c do not pass through the partitioning wall section 36b. The partitioning wall section 36b also has a plurality of (e.g., three) openings 43b for exposing terminals 26 of the motor 11 to the first space 32c. The openings 43b pass completely through the partitioning wall section 36b.

In the illustrated embodiment, the first bearing 30 is, for example, a ball bearing type bearing. The bearing 30 has an inner race 30a and an outer race 34b. The bearing 30 serves to rotatably support the first end of the second case member 34 that is mounted on an external circumferential surface of the first cylindrical section 36c. A seal member 30c is arranged on an outward side of the first bearing 30. The seal member 30c serves to seal a gap between the first cylindrical section 36c and an outer race 30b. An O-ring 60 is arranged as a seal between the outer race 30b and the second case member 34. Another O-ring 61 is arranged as a seal between the hub axle 15 and an internal circumferential portion of the first boss 36a. As a result, it is more difficult for contaminants to penetrate the second space 34a inside the second case member 34 from outside the first case member 32. It is also more difficult for a sound produced by the motor 11 to propagate to the outside.

Figure 5:
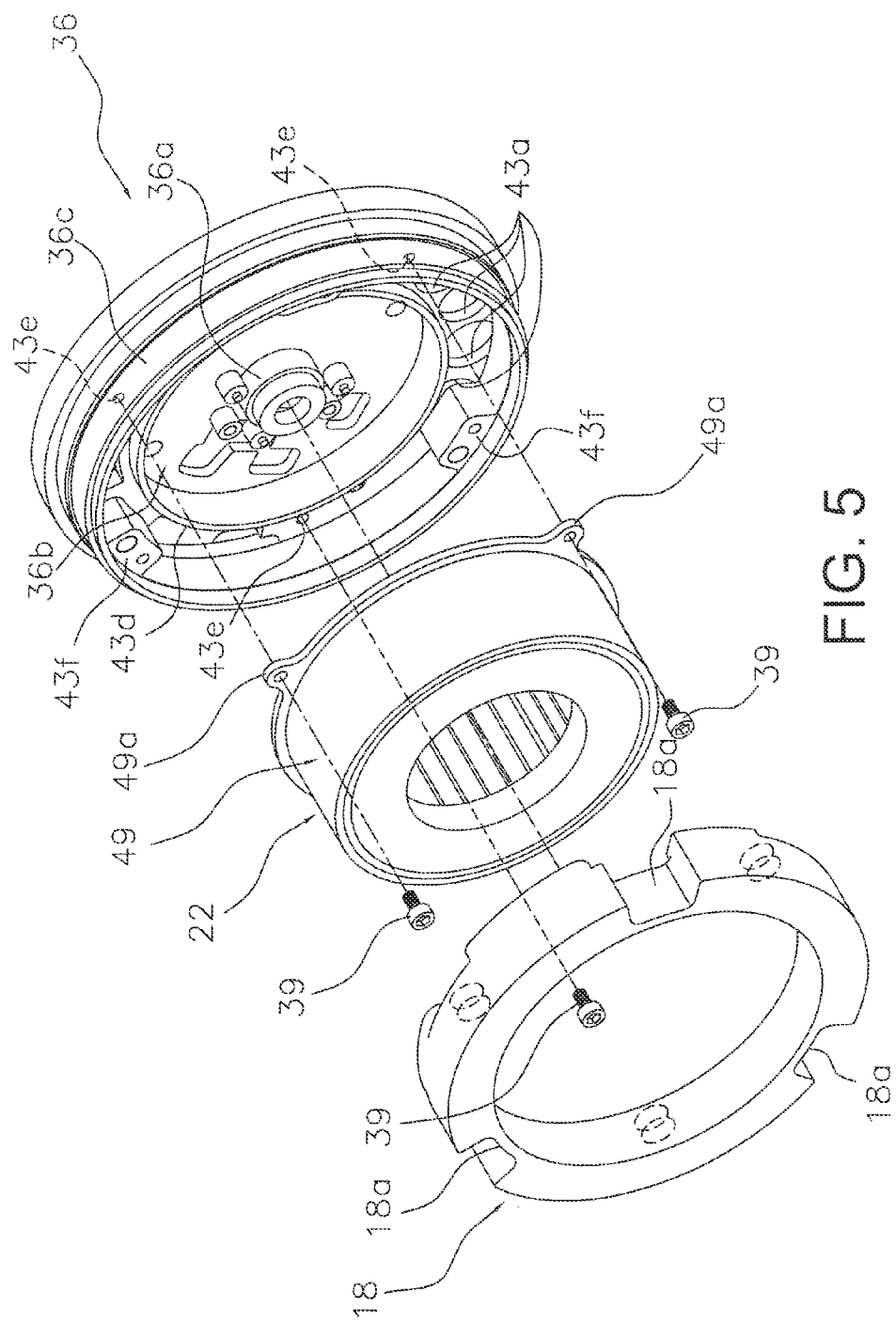
FIG. 5 is an exploded perspective view of a left-hand side of the soundproofing member, the motor and the case body illustrated in FIG. 4.

As shown in FIG. 5, the case body 36 has a cylindrical section 43d that is formed on an inward side face (right-hand side in FIG. 2) of the partitioning wall section 36b for adjusting a position of the stator 22 (explained later) of the motor 11. An inward side face of the partitioning wall section 36b is provided with a plurality of (e.g., three) threaded holes 43e. The threaded holes 43e are provided in the partitioning wall section 36b for fastening the stator 22 of the motor 11 with a plurality of (e.g., three) bolt members 39. The threaded holes 43e are arranged in positions radially outward from the cylindrical section 43d, and are spaced apart from one another along a circumferential direction. The case body 36 has a plurality of (e.g., three) mounting sections 43f. The mounting sections 43f are provided between the first cylindrical section 36c and the cylindrical section 43d of the partitioning wall section 36b. The mounting sections 43f are arranged to be spaced apart from one another in a circumferential direction.

A cylindrical gear mounting section 35 is fitted onto an external circumferential surface of a tip end portion of the first cylindrical section 36c such that it is coaxial with respect to the rotor 21 and cannot rotate with respect to the first cylindrical section 36c. The gear mounting section 35 has a cylindrical portion 35a and a mounting portion 35b. The mounting portion 35b is provided on the end of the gear mounting section 35 that fits onto the external circumferential surface of the first cylindrical section 36c (right-hand end in FIG. 2). The mounting portion 35b has an annular shape and is formed integrally on an internal circumferential surface of the cylindrical portion 35a. A serrated section 35c is provided on an internal circumferential surface of the other end (left-hand end in FIG. 2) of the cylindrical section 35a and serves to engage non-rotatably with an internal gear 48b (explained later). The gear mounting section 35 is fastened to the mounting sections 43f with bolt members 45.

As shown in FIGS. 1 and 3, the cover member 38 has the recessed section 32a and the bulged section 32b, which are provided on an outward side face. On an inward side of the cover member 38, a seal member 62 is arranged between the cover member 38 and the case body 36 to prevent liquids from entering a space in which the motor control circuit 19 is arranged. The seal member 62 is arranged on an inward side face of the cover member 38 along an outer periphery of the bulged section 32b and outside the recessed section 32a. The seal member 62 is made of rubber or other material having a waterproofing quality and a cushioning quality. As shown in FIG. 3, the seal member 62 is installed into a seal groove 36f formed in an outwards side face of the partitioning wall section 36b of the case body 36. The seal member 62 also functions to make it more difficult for a sound of the motor 11 to propagate to the outside.

As shown in FIGS. 2 and 4, the recessed section 32a is slightly wider than the shape of a tip end portion of a typical front fork in order to accommodate a variety of front fork shapes.

The first space 32c is formed on the outward side of the partitioning wall section 36b by the case member 36 and the cover member 38. The first space 32c is generally U-shaped. The motor control circuit 19 is fixed to the partitioning wall section 36b. The motor control circuit 19 is arranged in the first space 32c.

As shown in FIG. 1, a wire connecting section 38a is formed on one edge portion of the recessed section 32a. The wire connecting section 38a protrudes in a radially outward direction. The wire connecting section 38a is provided for routing an electric power line 70 to the outside of the hub. The electric power line 70 serves to connect the motor control circuit to an external device. The wire connecting section 38a has a connector 41 to which the electric power line 70 can be connected. In this embodiment, the electric power line 70 is configured such that it can both supply electric power and carry communication signals by means of PLC (power line communications). The connector 41 is provided on a tip end of the wire connecting section 38a. The electric power line 70 has, for example, two wires and the connector 41 has, for example, two female connectors for the two wires.

As shown in FIG. 2, the second case member 34 is shaped generally like a bottomed cylinder. The second case member 34 has a similar structure to a hub shell of a typical bicycle hub. The second case member 34 includes a second boss section 34b, a circular plate-like section 34c and a second cylindrical section 34d. The second boss section 34b is supported on the second bearing 31. The circular plate-like section 34c is formed as an integral unit with the second boss section 34b as a one-piece, unitary member. The second cylindrical section 34d extends inward along an axial direction of the hub axle from an outer periphery of the circular plate-like section 34c.

The second bearing 31 is installed between the hub axle 15 and an internal circumferential surface of the second boss section 34b. The second bearing 31 has an inner race 31a and outer race 31b. The inner race 31a is screwed onto the third externally threaded section 15f of the hub axle 15 such that the inner race 31a is adjustably positioned in an axial direction. After the axial position of the inner race 31a is adjusted, the first lock nut 51 is installed to prevent the inner race 31a from rotating. The outer race 31b is installed on an internal circumferential surface of the second boss section 34b. A seal member 31c serving to seal a gap between the second boss section 34b and the inner race 31a is arranged on an outward side of the second bearing 31. An O-ring 65 is arranged between an internal circumferential surface of the inner race 31a and an external circumferential surface of the hub axle 15. As a result, contaminants cannot easily penetrate into the second space 34a from the second end side of the second case member 34.

The second cylindrical section 34d is arranged on an outward side of the first cylindrical section 36c. The outer race 30b of the first bearing 30 is installed on an internal circumferential surface of the first end side of the second cylindrical section 34d. A first hub flange 40a and a second hub flange 40b are formed on both ends of an external circumferential surface of the second cylindrical section 34d so as to be spaced apart along the axial direction of the hub for connecting spokes between a rim of the front wheel and the internal motorized bicycle hub 10.

Since the partitioning wall section 36b is provided between the first space 32c and the second space 34a, heat from a coil section installed in the stator 22 can be transmitted to the partitioning wall section 36b and an the amounted of heat transmitted to the circuit board can be reduced, thus enabling the control section to achieve a stable control of the motor.

The soundproofing member 18 is an annular member, as shown in FIGS. 2, 4, and 5. The soundproofing member 18 is made of, for example, an elastic material. The sound proofing material 18 is arranged between an internal circumferential surface of the first cylindrical section 36c of the partitioning wall section 36 and an external circumferential surface of the cylindrical mounting section 49 of the stator 22. The soundproofing material 18 is made of, for example, nitrile butadiene rubber. The soundproofing member 18 is arranged such that a portion contacts an inward side face of the partitioning wall section 36b and obstructs the openings 43a. The soundproofing member 18 contacts at least a portion of the inward side face of the partitioning wall section 36b that surrounds the openings 43a. The soundproofing member 18 is arranged between the first cylindrical section 36c and the cylindrical section 43d in a position corresponding to the openings 43a. The soundproofing member 18 is provided to prevent a sound emitted inside the second space 34a, i.e., the operating sound of the motor and the operating sound of the rotation transmitting mechanism 25, from propagating to the outside of the partitioning wall section 36b through the openings 43a.

Recessed portions 18a are formed in the soundproofing member 18 at positions corresponding to the mounting sections 43f to avoid the mounting sections 43f. The mounting sections 43f are arranged in the recessed sections 18a such that they contact the recessed sections 18a. Recessed sections 18b are formed in the soundproofing material 18 to avoid the head portions 39a of the bolt members 39 that fasten the motor 11. The recessed sections 18b are arranged and configured such that the bolt heads 39a fit therein. The soundproofing member 18 is held in place by the mounting portion 35b of the mounting section 35.

A radial dimension of the soundproofing member 18 prior to installation is larger than a distance between an internal circumferential surface of the first cylindrical section 36c and an external circumferential surface of the mounting section 49 of the stator 22. As a result, the soundproofing member 18 is slightly compressed in a radial direction when it is installed in the partitioning wall section 36b and the openings 43a of the partitioning wall section 36b are obstructed by the soundproofing member 18. Consequently, noise generated inside the partitioning wall section 36b does not readily propagate to the outside and the noise of the motor 11 can be reduced.

Figure 6:
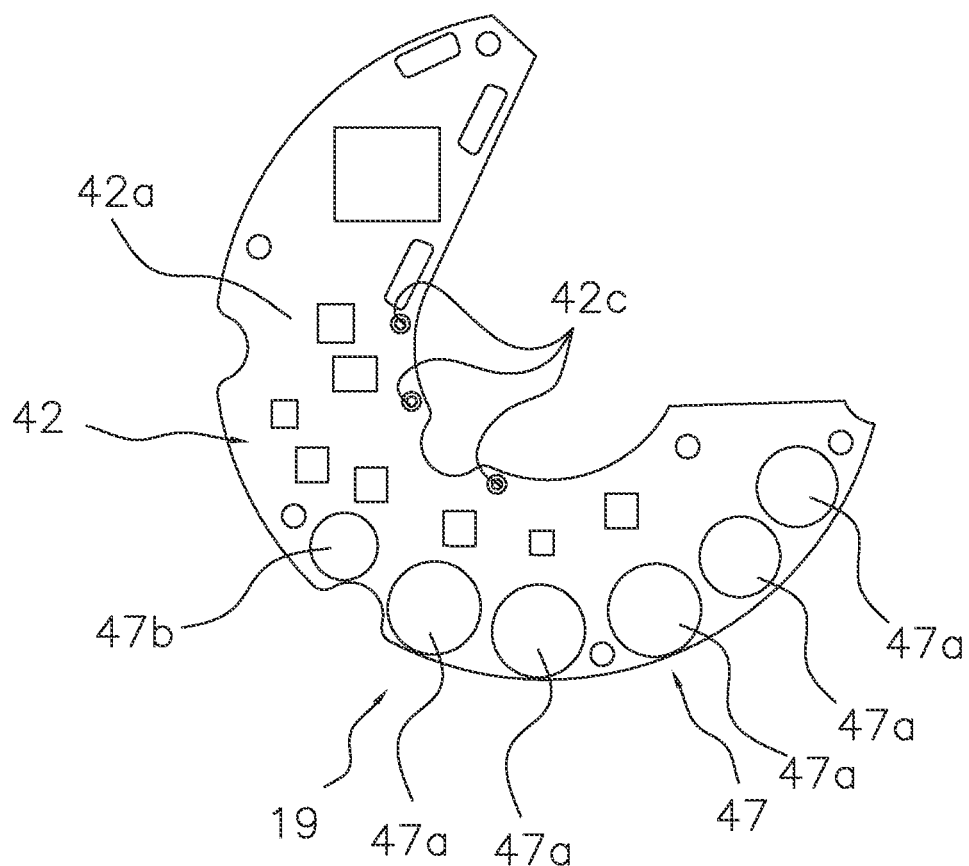
FIG. 6 is a plan view showing a first mounting surface of a circuit board.

As shown in FIGS. 3 and 6, the motor control circuit 19 has a circuit board 42. The circuit board 42 is fixed to a mounting boss 36e. As shown in FIG. 2, the circuit board 42 is arranged alongside the motor 11 in an axial direction of the hub axle 15. Thus, the circuit board 42 is adjacent to the motor 11 along a direction parallel to the hub axle 15. The circuit board 42 has a first mounting surface 42a (FIG. 6) arranged facing the partitioning wall section 36b and a second mounting surface 42b (FIG. 3) arranged facing the cover member 38. The circuit board 42 has a plurality of first electrical elements 47 mounted to the first mounting surface 42a. The first electrical elements 47 include, for example, a plurality of (e.g., five) capacitors 47a (examples of an electrical component) for smoothing and noise elimination and a transformer 47b. It is acceptable if there are other electrical elements mounted on the first mounting surface 42a in addition to the first electrical elements 47. As shown in FIG. 3, the first electrical elements 47 are arranged such that portions thereof pass into the openings 43a and the recessed portions 43c. The first electrical elements 47 are further arranged such that a gap exists between the first electrical elements 47 and the partitioning wall section 36b. The first electrical elements 47 are, for example, capacitors.

Since a portion of each of the electrical components is arranged in one of the openings 43a and/or one of the recessed sections 43c, the length of the internal motorized bicycle hub 10 in an axial direction of the hub can be shortened. Also, since the motor 11 and the circuit board 42 can be arranged in different spaces due to the partitioning wall section 36b, the electrical components are less likely to be affected by heat emitted from the motor 11.

The circuit board 42 has a plurality of second electrical elements 44. The second electrical elements 44 are mounted to the second mounting surface 42b. As shown in FIG. 3, the second electrical elements 44 constitute an inverter circuit 19a and an power line communication circuit 19b. The inverter circuit 19a is configured to convert a direct current supplied from an electric power source into an alternating current by means of switching. The inverter circuit 19a is used both to vary a drive force of the internal motorized bicycle hub 10 by varying a duty ratio and to vary a regenerative braking force generated when the internal motorized bicycle hub 10 is used as an electric generator. The inverter circuit 19a is connected to the terminals 26 (explained later) of the motor 11. As result, the circuit board 42 can be arranged close to the motor 11 and the task of arranging the wiring can be accomplished more easily.

The inverter circuit 10a includes a plurality of (e.g., six) field effect transistors (FET) 44a and other electrical elements.

As shown in FIG. 3, the motor 11 has the stator 22 arranged around the outside of the rotor 21 such that a radial gap is formed between the stator 22 and the rotor 21. The motor 11 has a plurality of (e.g., three) terminals 26. The rotor 21 is arranged inside the second space 34a and rotatably supported on the hub axle 15. The rotor 21 comprises a magnet 21a having a plurality of magnetic poles arranged along a circumferential direction and a magnet holding section 21b that holds the magnet 21a. The magnet holding section 21b is rotatably supported on the hub axle 15 by a first bearing 66a and a second bearing 66b arranged spaced apart from each other along an axial direction of the hub.

The stator 22 is arranged radially outward of the rotor 21 inside the second space 34a. The stator 22 is fixed to the partitioning wall section 36b of the case body 36 and has a plurality of (e.g., twelve) coil sections 46 arranged to be spaced apart from each other in a circumferential direction.

The stator 22 has a mounting section 49 for securing the coil sections 46. The mounting section 49 functions as a yoke. The mounting section 49 is a cylindrical member made of metal and mounting protrusions 49a are provided on an external circumferential surface of the mounting section 49 at one end of the mounting section 49 along the axial direction of the hub axle 15. The mounting section 49 is installed on an external circumferential surface of the cylindrical section 43d, and an internal circumferential surface of the mounting section 49 is positioned by the cylindrical section 43d. In this embodiment, the mounting section 49 is fastened to the partitioning wall section 36b by passing the three bolt members 39 through the protrusions 49a and screwing them into the threaded holes 43e. The coil sections 46 are excited sequentially with alternating current produced by the switching action of the field effect transistors 44a in the inverter circuit 19a of the motor control circuit 19 and cause the rotor 21 to rotate in an advancement direction of the bicycle.

The coil sections 46 of the stator 22 are molded into an electrically insulating resin member together with base end portions of the terminals 26. The terminals 26 are connected to the coil section 46 and provided in the openings 43b. The openings 43b are substantially obstructed by the resin member. The terminals 26 extend parallel to the hub axle 15. Tip end portions of the terminals 26 are arranged inside the first space 32c. The tip end portions of the terminals 26 are inserted through terminal connection holes 42c provided in the circuit board 42 and electrically connected directly to conductors formed on the circuit board 42 by soldering or another appropriate connecting means.

The rotation transmitting mechanism 25 serves to transmit rotation of the rotor 21 to the second case member 34 and rotation if the second case member 34 to the rotor 21. The rotation transmitting mechanism 25 has a planetary gear mechanism 48. The planetary gear mechanism 48 includes a sun gear 48a, an internal gear 48b and a plurality of (e.g., three) planet gears 48c. The sun gear 48a is fixed to the rotor 21. The sun gear 48a is coupled to the magnet holding section 21b of the rotor 21 by bolt members 55 such that the sun gear 48a can rotate as an integral unit with the rotor 21. The internal gear 48b is provided in the case body 36. The internal gear 48b is arranged around an outer circumference of the sun gear 48a. The internal gear 48b is coupled non-rotatably to the gear mounting section 35 of the case body 36. The planet gears 48c are arranged to mesh with both the sun gear 48a and the internal gear 48b. The planet gears 48c are rotatably supported by a carrier 48d. Each of the planet gears 48c has a first gear section and a second gear section having different tooth counts. The first gear section meshes with the sun gear 48a, and the second gear section meshes with the internal gear 48b. The carrier 48d is fixed to an inward side face of the circular plate-like section 34c of the second case member 34. With this planetary gear mechanism 48, since the case body 36 in which the internal gear 48b is provided is fixed non-rotatably to the hub axle 15, rotation of the sun gear 48a (which is connected to the rotor 21) is reduced to a lower speed and transmitted to the second case member 34.

When the soundproofing member 18 is installed into the partitioning wall section 36b, the stator 22 of the motor 11 is first fixed to the partitioning wall section 36b with the bolt member 39. Then, the soundproofing member 18 is attached to an outer circumference of the cylindrical section 43d. When this is done, the recesses 18 is aligned with the mounting sections 43f. As a result, the openings 43a, which enable the first space 32c and the second space 34a to communicate through the partitioning wall section 36b, are obstructed. After the soundproofing material 18a has been installed, the gear mounting section 35 is fixed to the mounting sections 43f with the bolt members 45. As a result, he soundproofing member 18 is held in place by the annular mounting portion 35b of the mounting section 35.

While only selected embodiments have been chosen to illustrate the present invention, it will be apparent to those skilled in the art from this disclosure that various changes and modifications can be made herein without departing from the scope of the invention as defined in the appended claims.

Although in the previously explained embodiment the soundproofing member is made of nitrile butadiene rubber, the soundproofing member can be made of any material so long as the material has an elastic quality.

Although in the previously explained embodiment all of the arrangement openings are obstructed together by the soundproofing member, it is also acceptable for the openings to be obstructed individually.

Although in the previously explained embodiment the soundproofing member is not inserted into the openings 43a, it is acceptable to insert a portion of the soundproofing member into the openings 43a. In such a case, the portions of the soundproofing member that are to be inserted into the openings 43a can be formed slightly larger than the openings 43a such that they fully obstruct the openings 43a when they have been pushed into the openings 43a.

In another embodiment, it is acceptable for the soundproofing member to be secured to the partitioning wall section 36 with an adhesive or with a screw member. If an adhesive is used, it is preferable for the adhesive to be heat resistant.

The mechanical features of the motor 11 are not limited to those of the previously explained embodiment. For example, although the motor of the previously explained embodiment has an inner rotor, it is acceptable for to use a motor having an outer rotor.

It is acceptable for the soundproofing member 18 to be compressed in an axial direction of the hub axle instead of a radial direction. For example, it is acceptable if an axial dimension of the soundproofing member 18 before it is installed is longer than a distance between the mounting portion 35b of the gear mounting section 35 and the inward side face of the partitioning wall section 36b.

Thus, the foregoing descriptions of the embodiments of the internal motorized bicycle hub are provided for illustration only, and not for the purpose of limiting the invention as defined by the appended claims and their equivalents.

What is claimed is:

1. An internal motorized bicycle hub comprising:
a hub axle;
a motor including a stator;
a partitioning wall section having least one opening and the stator mounted thereon;
at least one soundproofing member disposed adjacent the partitioning wall section and blocking the at least one opening;
an electrical component having a portion of the electrical component extending into the at least one opening; and
a circuit board disposed adjacent the partitioning wall section, and the circuit board having the electrical component mounted thereon.

2. The internal motorized bicycle hub according to claim 1, further comprising
a motor case having the partitioning wall section, which divides the motor case into a first space housing the circuit board and a second space housing the motor.

3. The internal motorized bicycle hub according to claim 1, wherein the circuit board includes a drive circuit that is electrically coupled to the motor.

4. The internal motorized bicycle hub according to claim 2, wherein
the motor case includes a first case member defining the first space and a second case member defining the second space, the first case member having the partitioning wall section, the first case member being non-rotatably connected to the hub axle, and the second case member having a first end rotatably supported on the first case member and a second end rotatably supported on the hub axle.

5. The internal motorized bicycle hub according to claim 4, wherein
the first case member includes a case body and a cover member, the case body being non-rotatably attached to the hub axle and having the partitioning wall section, and the cover member being fixed to the case body to form the first space between the cover member and the partitioning wall section.

6. An internal motorized bicycle hub comprising:
a hub axle;
a motor including a stator;
a partitioning wall section having least one opening and the stator mounted thereon; and
at least one soundproofing member disposed adjacent the partitioning wall section and blocking the at least one opening, the at least one soundproofing member being disposed radially outward of a radially outermost portion of the motor with respect to a rotational axis of the hub axle, the soundproofing member being an elastic member.

7. The internal motorized bicycle hub according to claim 2, wherein
the circuit board includes a drive circuit that is electrically coupled to the motor.

8. The internal motorized bicycle hub according to claim 7, wherein
the motor case includes a first case member defining the first space and a second case member defining the second space, the first case member having the partitioning wall section, the first case member being non-rotatably connected to the hub axle, and the second case member having a first end rotatably supported on the first case member and a second end rotatably supported on the hub axle.

9. The internal motorized bicycle hub according to claim 8, wherein
the first case member includes a case body and a cover member, the case body being non-rotatably attached to the hub axle and having the partitioning wall section, and the cover member being fixed to the case body to form the first space between the cover member and the partitioning wall section.

* * * * *